Figure 1:
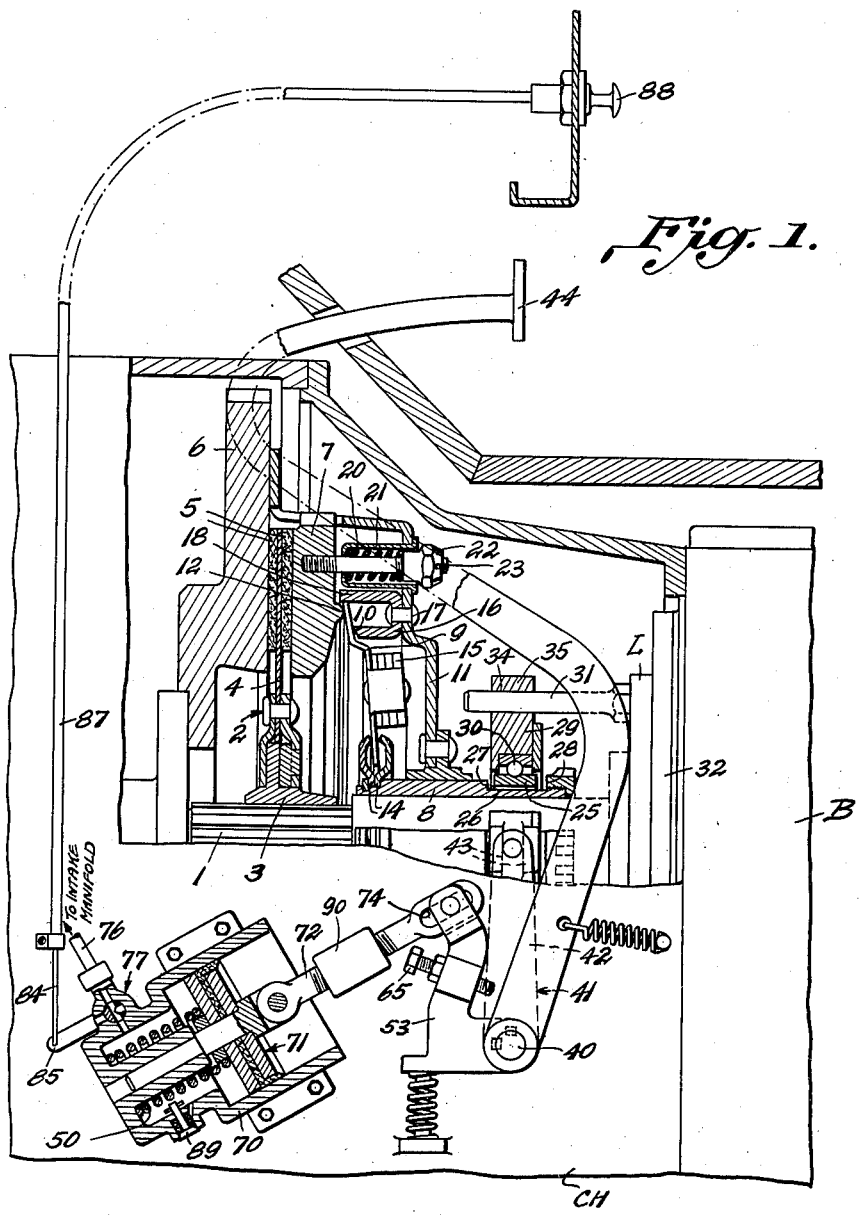

June 3, 1941.   C. B. SPASE   2,244,128
OPERATING MECHANISM FOR CLUTCHES
Filed April 28, 1933   2 Sheets-Sheet 1

INVENTOR:
Charles B. Spase,
BY Bodell & Thompson
ATTORNEYS.

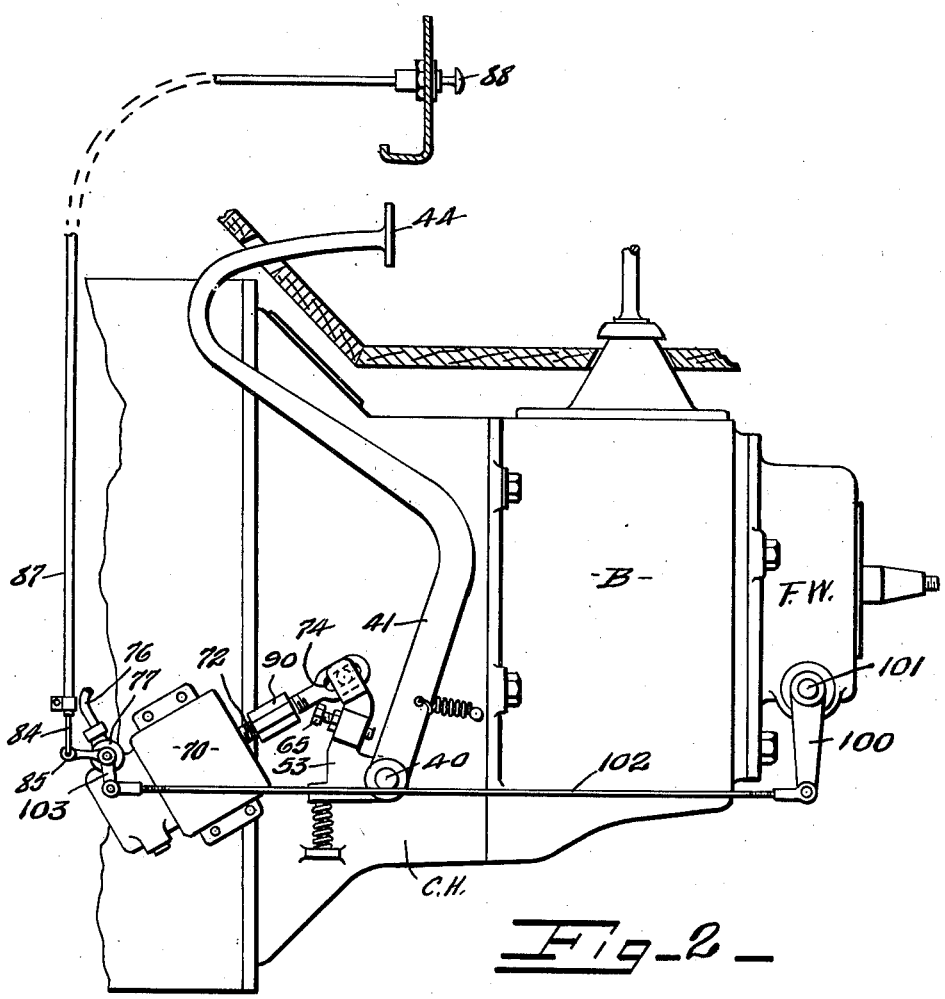

Patented June 3, 1941

2,244,128

UNITED STATES PATENT OFFICE 2,244,128

OPERATING MECHANISM FOR CLUTCHES

Charles B. Spase, Nedrow, N. Y., assignor to W. C. Lipe Inc., Syracuse, N. Y., a corporation of New York Application April 28, 1933, Serial No. 668,395

2 Claims. (Cl. 192—105)

This invention relates to clutches for motor vehicles for transferring the power of the engine to the drive wheel of the vehicle, usually through a suitable transmission gearing, and has for its object, a clutch operating mechanism in which the clutch, at the option of the driver, acts as an automatic or centrifugal clutch or as a non-automatic clutch or clutch operated by the driver, and particularly power means controlled at the will of the operator, for effecting the conversion of the clutch into an automatic or non-automatic clutch. More specifically, the invention has for its object an automatic clutch having a normally idle clutch spring means and a vacuum chamber, which is connected to the manifold of the engine of the vehicle, at the will of the operator and which, when connected with the source of power or vacuum, converts the clutch into an automatic clutch and relieves the clutch of the action of the clutch spring means, and further a correlation of the clutch spring means and the vacuum operated member, whereby when the vacuum is effective, the clutch is converted into an automatic clutch controlled by the centrifugal means of the clutch, but when the vacuum drops or becomes inadequate, the clutch immediately and automatically becomes a non-automatic clutch subject to the control of the operator through the clutch pedal, and further the converting of the clutch into an automatic or non-automatic clutch by a control valve in the conduit connections between the power means and the source of power or manifold of the engine, which valve is operable at the will of the operator.

It will be understood that in vehicles having automatic or centrifugal clutches, there is a free wheeling unit used in the transmission line, usually in the rear of the transmission gearing and that the free wheeling unit breaks the drive from the rear wheels, when the driver decelerates and consequently gives the centrifugal clutch a chance to be released of the driving force from either the engine or the rear wheels regardless of the vehicle speed. Therefore, the driver can, at his option, lock the free wheeling unit so that the vehicle is relieved of the free wheeling effect at the same instant that he exercises his option to convert the clutch from an automatic into a non-automatic clutch. In other words, in automobiles having free wheeling units, the driver, at his option, can cut in or cut out the free wheeling unit and the control for the free wheeling unit can be connected with the control for converting the clutch from an automatic into a non-automatic clutch, so that when the clutch is converted into a non-automatic clutch the free wheeling unit is automatically cut out.

The invention consists in the novel features and in the combinations and constructions hereinafter set forth and claimed.

In describing this invention, reference is had to the accompanying drawings in which like characters designate corresponding parts in all the views. Figure 1 is a fragmentary side elevation, partly broken away and with the clutch partly in section, of a clutch assembly embodying my invention, the operating mechanism being shown as in its position occupied when the clutch spring is idle or cut out, that is when the clutch is acting as an automatic clutch. Figure 2 is a fragmentary side elevation of a structure embodying my invention and including a clutch housing assembled with a gear box having a free wheeling unit at the rear end thereof and showing the connection for cutting out the free wheeling unit automatically when the clutch is converted from an automatic to a non-automatic clutch.

In my Patent No. 2,117,520 issued May 17, 1938, I have shown one form of means for converting a clutch from an automatic into a non-automatic clutch and vice-versa by manually operated means, which connects and disconnects a clutch spring into and out of effective position to act on the throw-out shaft or throw-out collar.

The present invention relates to means performing the same function by power as by connecting and disconnecting the clutch spring into and out of effective position to act on the throw-out collar or throw-out shaft by utilizing a vacuum motor connected to the intake manifold of the engine of the motor vehicle, with the vacuum acting in opposition to the clutch spring, and the clutch spring acting to overcome the vacuum when it decreases a predetermined amount, as for instance, when the engine is working as when climbing a hill under a heavy load and below a predetermined R. P. M.

The invention comprises, generally, clutch spring means operable at the option of the operator alternately with the automatic or centrifugal means for engaging and disengaging the clutch of a motor vehicle, a coupling operable to shift the spring into and out of effective or active position to engage the clutch so that when it is in operative position, the clutch is non-automatic, power means, which is preferably a vacuum motor connected to the intake manifold of the engine of the vehicle, for shifting said coupling and relieving the clutch of the clutch spring and a valve operable at the will of the operator for opening and closing the conduit connecting the vacuum means and the source of vacuum.

1 designates the clutch shaft; 2 the shiftable or driven member of the clutch, this having a hub 3 splined on the shaft and capable of shifting axially, within limits, thereon, and a disk 4 secured to the hub in any suitable manner and carrying friction disks 5 on opposite sides thereof, one friction disk coacting with the surface on the driving member 6 of the clutch which is usually the fly-wheel of the engine of the motor vehicle, and the other friction disk 5 coacting with an axially shiftable pressure member or ring 7.

9 designates one of an annular series of levers fulcrumed at 10 near their outer ends on a fulcrum carried by the back plate 11 of the clutch, thrusting at 12 at their outer ends against an annular fulcrum ring on the pressure ring 7 and coupled at their inner ends to the throw-out sleeve by suitable means, as a pair of collars 14 secured to the inner end of the throw-out sleeve 8, these collars 14 providing a groove in which the inner ends of the levers 9 extend. These levers move forwardly, that is, to the left in the drawings, toward the plane of the fulcrum 10 to disengage the clutch and rearwardly away from said plane to engage the clutch and in order to make the operation of the clutch automatic, the inner arms of the levers, that is, the arms between the fulcrum 10 and inner ends of the levers, are provided with weights 15. The fulcrums 10 are provided at the edge of one flange of an annular channel-shaped piece 16, the intermediate portion of which is secured, as by rivets 17, to the back plate 11, and the other flange 18 of which extends around the extreme outer ends of the levers to prevent displacement thereof. The levers 9 are weighted sufficiently so that with a predetermined R. P. M. of the clutch, the weights will be thrown outwardly by the centrifugal action, causing the clutch to engage and will move inwardly at a speed below said R. P. M. to cause the clutch to disengage and during the operation of the levers by the weights 15, the throw-out sleeve 8 idles backwardly and forwardly. However, insofar as this invention is concerned, any other form of automatic clutch may be used.

20 designates one or more comparatively light springs tending to shift the pressure ring 7 out of engaged position against the centrifugal force of the weights 15 of the levers 9 when the clutch rotates at a speed below said predetermined R. P. M. Each spring 20 is here shown as located in a socket or thimble 21 suitably held in the back plate, and as thrusting at one end against the bottom of the thimble and at its other end against the head 22 of a screw 23 extending axially through the thimble and threading into the pressure ring 7.

25 is a throw-out collar slidable axially of the rear end of the throw-out sleeve 8, which rear end extends to the rear of the back plate 11, this being located in an annular channel 26 formed in the throw-out sleeve providing shoulders 27, 28, between which the throw-out collar 25 works.

29 is a yoke, or collar, for operating the throw-out collar 25, the collar 29 being non-rotatable. A suitable anti-friction bearing 30 is located between the collar 29 and the collar 25. The non-rotatable collar 29 is here shown as slidably mounted on studs as 31 which usually project from the rear wall of the clutch housing which is the front wall of the gear box B, or from the bearing cap 32 in the front wall of the gear box B. It will be understood that the stem gear or drive shaft of the transmission gearing is journalled in a removable bearing cap fixedly secured or bolted to the front wall of the transmission housing or gear box. The studs, or pins 31 are secured in any suitable manner to the bearing cap, and as here shown, the bearing cap is provided with diametrically opposite lugs at L to which the studs or pins 31 are secured, and these pins slidably fit bores 34 provided in similar lugs 35 on the collar 29.

The clutch here shown is of the push-in type. That is, the type in which the throw-out collar pushes in, or forwardly, toward the clutch to disengage it. It is here shown, when operated by the clutch pedal, as operated from a throw-out rock shaft 40 suitably mounted in the usual manner in the clutch housing CH or the bell between the fly wheel housing and the gear box B and having a yoke 41 thereon, the arms 42 of which thrust against or work between opposing bearing surfaces 43 provided on the collar 29. The shaft 40 is operated by the usual clutch pedal 44. When the clutch is operating as an automatic clutch, the throw-out collar 25 is normally arranged so that it is spaced apart from the shoulder 28 of the throw-out sleeve 8 a sufficient distance to permit the throw-out sleeve 8 to idle during the automatic operation of the clutch levers 9 under the centrifugal force. When, however, the clutch is being used as a non-automatic clutch, or under the influence of a clutch spring to hold the clutch engaged, the throw-out collar thrusts against the shoulder 28, it being caused to take this position by the clutch spring. When the throw-out collar 25 is operated by the clutch pedal 44, when being operated against the clutch spring, the collar 25 moves away from the shoulder 28 first relieving the throw-out collar of the force of the clutch spring, and then thrusts against the shoulder 27 positively actuating the sleeve 8 inward to shift the levers 9 to "out" position. When the clutch is being used as an automatic clutch it may be, if desired, disengaged by operating the clutch pedal 44 to cause the throw-out collar 25 to thrust against the shoulder 27 and shift, or push, the throw-out sleeve 8 inwardly.

50 designates a clutch spring, this being shown as a compression spring acting on the throw-out collar 25 through the throw-out shaft 40 and yoke arms 42 and also through a lever 53 mounted on the clutch pedal shaft 40 and connected to the pedal 44 to transmit motion thereto, so that the force of the spring 50, when in active position will be applied through the yoke 41 and throw-out collar 25, throw-out sleeve 8 to the levers 9 to shift them to the right and hold the clutch engaged. The lever 53 is keyed or otherwise secured on the clutch shaft 40 and has an abutment 65, as an adjustable screw, for the clutch pedal to thrust against, the clutch pedal 44 being loosely mounted on the shaft 40.

The means operable at the option of the operator for connecting and disconnecting the clutch spring 50 into and out of position to act on the lever 53 or the throw-out collar 25 is a vacuum chamber and a movable member operated by the differences in pressure in said chamber to shift the spring into and out of effective position, a pipe connecting the vacuum chamber to the intake manifold of the engine and a control valve manually operable in said pipe.

In the illustrated embodiment of my invention, the vacuum chamber is a cylinder and the movable member a piston which is connected to the lever 53 by a connecting rod. 70 designates the vacuum cylinder, 71 the piston therein, and 72 the connecting rod which is pivotally connected at one end to the piston and at its other end to the lever 53, it being connected to the lever 53 by a lost motion or pin and slot connection 74 for a purpose to be presently described. The piston here illustrated has a tail rod guided in the head of the cylinder, and the piston is connected to the lever 53 by a connecting rod 72. The clutch spring 50 is arranged to thrust against the piston in opposition to the suction or vacuum. The spring 50 is of sufficient strength to hold the clutch engaged, when there is little or no vacuum in the cylinder 70, but is not of sufficient strength to overcome a full or nearly full effect of the vacuum, but on the other hand, the full effect of the vacuum is sufficient to overcome the spring and relieve the throw-out collar of the spring pressure so that the clutch can work as an automatic clutch. 76 is a suitable conduit connecting the cylinder 70 to the intake manifold of the engine of the vehicle and 77 designates a suitable three-way valve, which is operable at the option of the operator in any suitable manner.

For the purpose of illustration, a three-way rotary valve is shown herein, the casing of which is here illustrated as integral with the head of the cylinder 70. When it is desired to have the clutch operate, as a centrifugal or automatic clutch, the movable valve member is rotated so that one of its passages connects the vacuum pipe 76 and the cylinder 70. When it is desired to have the clutch work as a non-automatic clutch, the movable valve member is shifted so that the vacuum pipe 76 is closed and the cylinder open to the outer air through the valve 77. The movable member of the valve 77 is operated in any suitable manner by a control located within convenient reach of the driver of the vehicle, as on the instrument board of the vehicle. As here illustrated, the movable valve member is shifted by means of push and pull wire 84 connected at one end to a rock arm 85 on the movable valve member, the wire extending through a suitable guide or tube 87 to the instrument board where it is provided with a handle 88 exposed on the instrument board. Preferably, the cylinder is provided with a valve 89 in the head thereof, which is normally held open by a light spring and closed by the action of the suction, the spring being of sufficient tension to open the valve and let the clutch spring 50 move into effective position by breaking the vacuum when there is little vacuum in the cylinder 70 and the control valve 77 is in its position assumed when opening the cylinder pipe 70 to the vacuum.

The purpose of the lost motion or pin-and-slot connection 74, is to relieve the centrifugal levers 9 of any holding effect due to the vacuum so that the clutch can work as an automatic clutch, and also permit the lever 53 to remain in juxtaposition to the clutch lever 41 when the clutch is working as an automatic clutch so that it may, if desired, be thrown out by the operator by depressing the clutch pedal 41.

In operation, with the control valve 77 in the position shown in the drawings, wherein it connects the vacuum cylinder 70 in communication with the source of vacuum, the suction created when the engine is running, closes the valve 89 against its spring and draws the piston 71 compressing the clutch spring 50, or relieving the lever 53 of the action of the clutch spring 50, and hence the centrifugal levers 9 are free to act to engage the clutch when the engine develops a speed above the predetermined R. P. M. and to disengage the clutch when the engine develops a speed below the predetermined R. P. M. If, at any time, the operator desires to eliminate the automatic clutch feature, he does so by shifting the movable member of the valve 77 to cut off the connection with the source of vacuum and open the vacuum cylinder 70 to the outer air so that with the vacuum being broken in the vacuum cylinder 70, the clutch spring 50 is free to react and act on the throw-out collar 25 through the lever 53, shaft 49, and yoke arm 42. Hence, the clutch will now be held engaged by the clutch spring in the usual manner controlled by the clutch pedal 41 in the usual manner.

Under some conditions, as when the engine labors or runs below idling speed or the predetermined R. P. M., the clutch working automatically, will throw out when not intended. Under such conditions, the vacuum also becomes weak. Under such conditions, by my invention, the clutch is automatically converted into a non-automatic clutch because the clutch spring immediately becomes effective to hold the clutch engaged when the vacuum becomes too weak to hold the clutch spring. One of these conditions is when the car is laboring up a steep hill. Under such conditions, when the vacuum effect of the cylinder 70 drops to a low point, the valve 89 in the head of the cylinder 70 is opened by its spring permitting the vacuum in the cylinder 70 to be completely broken, thus letting the clutch spring react with full effect on the throw-out collar or the lever 53 and hold the clutch engaged, thus automatically converting the clutch into a non-automatic clutch, temporarily until the vacuum again builds up sufficiently to shift the clutch spring and connections operated thereby out of effective relation to the throw-out collar or the lever 53. Although the valve 89 is desirable to make the clutch spring quickly and fully effective, under the conditions outlined, nevertheless, the valve 89 may be dispensed with. The vacuum cylinder 70 with piston 71 and connection, as the rod 72, and lever 53 may be located inside or outside of the bell housing but are preferably located on the outside and the cylinder 70 formed in a casting, bolted or otherwise secured, to the outer side of the bell housing. The connecting rod 72 is usually formed in two sections adjustably connected together as by a turn-buckle 90 to initially adjust the length of the connecting rod.

As an automatic clutch is particularly desirable or its operation lends itself to best effect in connection with free wheeling units, it is obvious that the free wheeling unit might be controlled by the handle 88 or means for operating the valve 77 in synchronism therewith, that is, the operation of the valve 77 or the handle 88 to convert the clutch into an automatic clutch, at the same time may unlock the free wheeling unit so as to free the wheels of the vehicle, and when the valve 70 or the handle 88 is operated to convert the clutch into a non-automatic clutch, the free wheeling unit may be locked.

In Figure 2, one form of connection for controlling the free wheeling unit by the handle 88 is shown. FW designates the housing for the free wheeling unit and 100 a member operable to cut in and cut out the free wheeling unit, this being here shown as a rock arm on a rock shaft 101. This rock arm 100 or corresponding part is usually operated by its own manual located within easy reach of the driver of the vehicle. However, when used in connection with my invention, it is shown as operated from the handle 88 which operates the valve 77, and as here illustrated, the rock arm 100 is connected by a link 102 to a rock arm 103 rotatable with the rotary member of the valve 77 so that upon operation of the handle 88 to open the valve 77 and hence connect the cylinder 70 to the vacuum pipe 76, the arm 103 is also actuated to cut in the free wheeling unit, through the link 102 and rock arm 100; and when the handle 88 is operated to close the valve 77 and hence open the cylinder 70 to outer atmospheric pressure, the free wheeling unit is cut out through rock arm 103, link 102 and lever 100. Thus while the clutch is working as an automatic clutch, the free wheeling unit is cut in and when it is working as a non-automatic clutch, the free wheeling unit is cut out.

What I claim is:

1. In a clutch including a throw-out collar operable to disengage the clutch, a throw-out shaft for operating the throw-out collar, and centrifugal means for automatically throwing in the clutch at a predetermined R. P. M. and throwing out the clutch at less than said predetermined R. P. M., the combination of clutch spring means operating, when effective, on the throw-out collar to engage the clutch, vacuum means including a movable member, connections including the throw-out shaft between the movable member and the throw-out collar, said movable member opposing the spring means and operating to relieve the connections of the pressure of the spring means when the vacuum means is effective, a conduit connecting the vacuum means to a source of vacuum and a valve in said conduit and operable at the will of the operator, and a clutch pedal loosely mounted on the throw-out shaft and coacting with said connections to operate the same to throw out the clutch when said pedal is operated.

2. In a clutch including a throw-out collar operable to disengage the clutch, centrifugal means for automatically throwing in the clutch at a predetermined R. P. M. and throwing out the clutch at less than said predetermined R. P. M., the combination of clutch spring means operating, when effective, to engage the clutch, power operative means which, when operated, relieves the throw-out collar of the clutch spring means, a valve operable at the will of the operator for controlling the operation of the power means, and a clutch pedal for operating the clutch to throw out the clutch against the action of the clutch spring.

CHARLES B. SPASE.